United States Patent
Taniguchi et al.

(10) Patent No.: US 12,474,412 B2
(45) Date of Patent: Nov. 18, 2025

(54) BATTERY MONITORING SYSTEM

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Soya Taniguchi, Nisshin (JP); Yoshikazu Furuta, Nisshin (JP); Kazuo Matsukawa, Kariya (JP); Yoshiyuki Utagawa, Kariya (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 561 days.

(21) Appl. No.: 18/056,058

(22) Filed: Nov. 16, 2022

(65) Prior Publication Data

US 2023/0168311 A1   Jun. 1, 2023

(30) Foreign Application Priority Data

Nov. 26, 2021   (JP) .................................. 2021-192031

(51) Int. Cl.
G01R 31/396   (2019.01)
H01M 10/42   (2006.01)
H03K 21/40   (2006.01)
H04L 25/02   (2006.01)

(52) U.S. Cl.
CPC ........ *G01R 31/396* (2019.01); *H01M 10/425* (2013.01); *H03K 21/406* (2013.01); *H01M 2010/4271* (2013.01); *H04L 25/0276* (2013.01)

(58) Field of Classification Search
CPC .......... G01R 31/396; G01R 31/3648; G01R 31/382; H01M 10/425; H01M 10/4271; H01M 10/482; H03K 21/406; H04L 25/0272; H04L 25/4904; H04J 3/0638; H04Q 9/00
See application file for complete search history.

(56) References Cited

U.S. PATENT DOCUMENTS

2014/0045004 A1 * 2/2014 Butzmann ............... G01R 31/36
                                                    429/61
2019/0086475 A1   3/2019 Takeshita
2021/0377894 A1 * 12/2021 Kamath ............ H04W 56/0045

FOREIGN PATENT DOCUMENTS

JP    2020-021637 A    2/2020
WO  WO-2022205433 A1 * 10/2022  ............ G01R 31/36

OTHER PUBLICATIONS

Analog Devices, 12-Channel Multicell Battery Monitor ADBMS6815, © 2020.

* cited by examiner

*Primary Examiner* — David V Henze-Gongola
(74) *Attorney, Agent, or Firm* — Posz Law Group, PLC

(57) ABSTRACT

A battery monitoring system that monitors states of a plurality of batteries. The battery monitoring system includes a battery monitoring ECU and a plurality of battery monitoring devices. The battery monitoring ECU and the plurality of battery monitoring devices are connected to each other in any connection form of ring connection, daisy chain connection, or multi-drop connection.

6 Claims, 6 Drawing Sheets

BATTERY MONITORING SYSTEM

CROSS REFERENCE TO RELATED APPLICATION

This application is based on Japanese Patent Application No. 2021-192031 filed on Nov. 26, 2021, the disclosure of which is incorporated herein by reference.

TECHNICAL FIELD

The present disclosure relates to a battery monitoring system.

BACKGROUND

In recent years, automobiles using secondary batteries have been increasing. There is an increasing demand for a battery monitoring system (battery management system (BMS)) that measures electrical characteristics of a secondary battery to acquire a state of the inside of the battery, such as a state of charge (SOC) of the secondary battery.

SUMMARY

The present disclosure provides a battery monitoring system. A battery monitoring system that monitors states of a plurality of batteries. The battery monitoring system includes a battery monitoring ECU and a plurality of battery monitoring devices. The battery monitoring ECU and the plurality of battery monitoring devices are connected to each other in any connection form of ring connection, daisy chain connection, or multi-drop connection.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
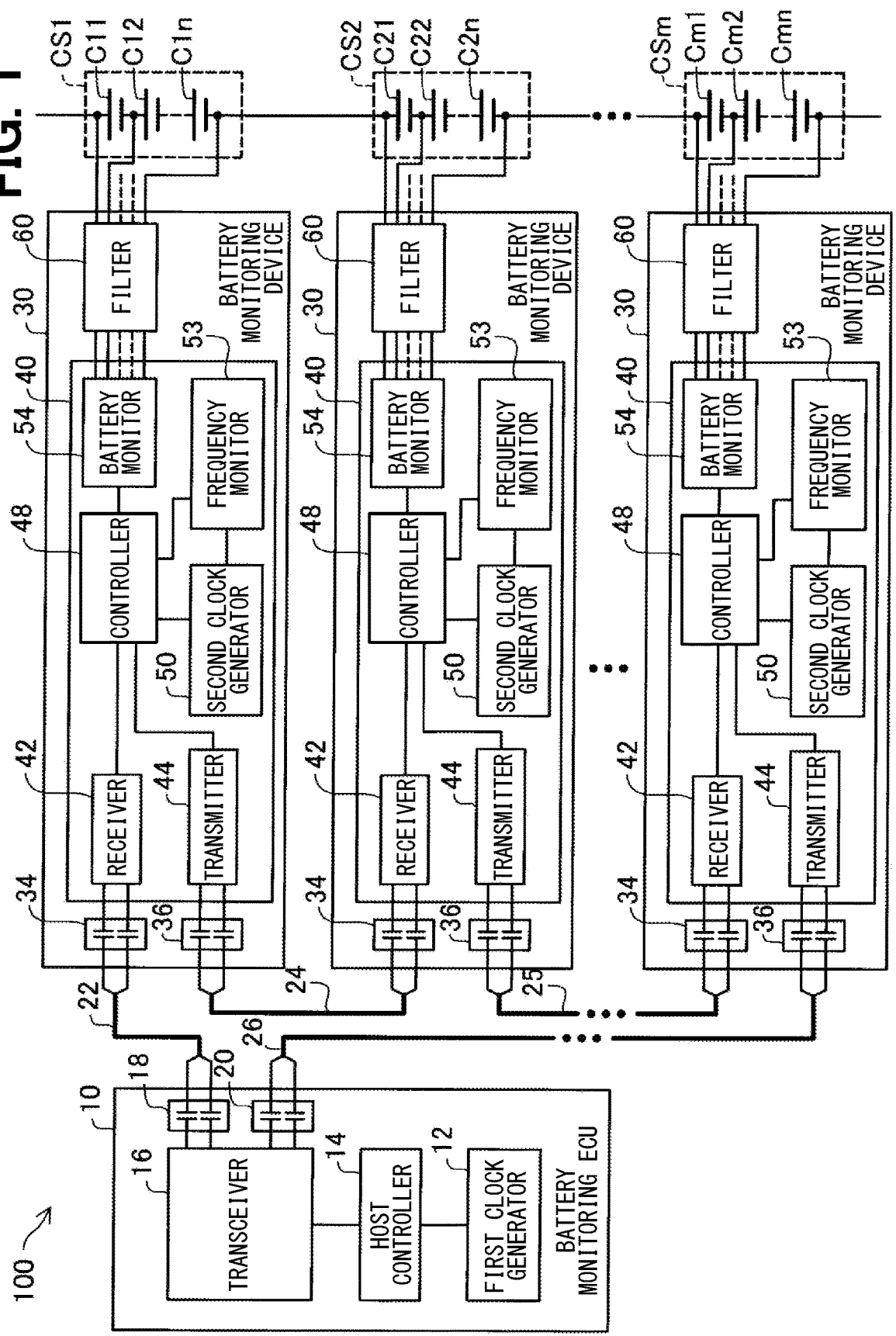
FIG. 1 is a schematic configuration diagram of a battery monitoring system according to a first embodiment.

For example, a battery monitoring system has been proposed in which a plurality of batteries is monitored by a plurality of battery monitoring ICs, and the plurality of battery monitoring ICs are daisy-chained. Such a battery monitoring system is provided with a battery monitoring ECU that performs overall control. When an instruction or the like is output from the battery monitoring ECU to a battery monitoring device on the first tier, each of a plurality of battery monitoring devices being daisy-chained adds its own data or the like to information received from a previous tier and transmits the information to a subsequent tier. The battery monitoring device on the last tier outputs all the information to the battery monitoring ECU. Each of the battery monitoring devices includes an oscillator, and measures and monitors the batteries by using an oscillation frequency of the oscillator.

In this case, in order to measure the state of each battery with high accuracy, it is necessary to increase accuracy of the oscillator frequency of each battery monitoring device. For this purpose, it is necessary to use a high-accuracy oscillator such as a crystal oscillator, as the oscillator of the battery monitoring device.

However, there has been a difficulty that constituting the oscillator of each battery monitoring device by a high-accuracy oscillator such as a crystal oscillator increases costs.

The present disclosure provides a battery monitoring system that makes measurement accuracy sufficient without using a high-accuracy oscillator in battery monitoring devices.

An exemplary embodiment of the present disclosure provides a battery monitoring system that monitors states of a plurality of batteries. The battery monitoring system includes a battery monitoring ECU and a plurality of battery monitoring devices. The battery monitoring ECU and the plurality of battery monitoring devices are connected to each other in any connection form of ring connection, daisy chain connection, or multi-drop connection. The battery monitoring ECU includes a first clock generator and a transceiver. The first clock generator generates a first clock signal. The transceiver outputs a superimposed signal in which battery monitoring information is superimposed on the first clock signal to at least one of the plurality of battery monitoring devices, and receives a monitoring result of the states of the plurality of batteries. Each of the plurality of battery monitoring devices includes a receiver, a second clock generator, a controller, a battery monitor, a frequency monitor, and a transmitter. The receiver receives the superimposed signal from a previous tier. The second clock generator generates a second clock signal serving as a reference of an operation of a corresponding battery monitoring device. The controller extracts a clock of the superimposed signal from the previous tier as a reference clock signal, and restores the battery monitoring information. The battery monitor monitors a state of one or more batteries of the corresponding battery monitoring device by using the second clock signal and the battery monitoring information. The frequency monitor monitors a difference between a frequency of the reference clock signal and a frequency of the second clock signal. The transmitter outputs, to a subsequent tier, the battery monitoring information, the monitoring result on tiers up to a present tier, and difference information indicating the difference on tiers up to the present tier.

In the exemplary embodiment of the present disclosure, a controller of a battery monitoring ECU can acquire an error of a frequency of a second clock signal of a battery monitoring device on each tier for a first clock signal, and monitor oscillation frequency information of all oscillators. Then, the controller can determine how much the frequency of the second clock signal of the battery monitoring device at which tier is to be corrected.

The present disclosure can also be implemented in various modes. For example, the present disclosure can be implemented in a mode of a battery monitoring method or the like in addition to the battery monitoring system.

First Embodiment (Configuration of Battery Monitoring System 100)

As illustrated in FIG. 1, a battery monitoring system 100 includes a battery monitoring Electronic Control Unit (ECU) 10 and a plurality (in the present embodiment, m which is an integer of 2 or more) of battery monitoring devices 30. The battery monitoring device 30 in an x-th tier (x is an integer of 1 to m) monitors a battery state of each of n (n is an integer of 1 or more) secondary batteries (hereinafter, referred to as "batteries") included in a battery pack CSx in the x-th tier. Therefore, the battery monitoring system 100 monitors a battery state of each of a plurality (in the present embodiment, m×n) of batteries C11 to Cmn. In the present embodiment, the number of batteries monitored by the battery monitoring device 30 at each tier is the same as n, but the number of batteries monitored by the battery monitoring device 30 at each tier may be different.

The battery monitoring ECU 10 includes two connectors 18 and 20, and each of the battery monitoring devices 30 includes two connectors 34 and 36. The battery monitoring ECU 10 and the plurality of battery monitoring devices 30 are ring-connected to each other. That is, one connector 18 of the battery monitoring ECU 10 is connected to one connector 34 of the battery monitoring device 30 on the first tier by a transmission path 22. The other connector 36 of the battery monitoring device 30 on the first tier is connected to one connector 34 of the battery monitoring device 30 on the second tier by a transmission path 24. The other connector 36 of the battery monitoring device 30 on the second tier is connected to one connector 34 of the battery monitoring device 30 on the third tier by a transmission path 25. Then, up to the battery monitoring device 30 on the last tier, the other connector 36 of the battery monitoring device 30 on the previous tier is connected to one connector 34 of the battery monitoring device 30 on a present tier by a transmission path. The other connector 36 of the battery monitoring device 30 on an m-th tier which is the last tier, is connected to the other connector 20 of the battery monitoring ECU 10 by a transmission path 26. In this manner, the battery monitoring ECU 10 and the plurality of battery monitoring devices 30 are connected to each other so as to form one ring.

Although details will be described later, the battery monitoring ECU 10 operates on the basis of a first clock signal generated by a first clock generator 12 included in the battery monitoring ECU 10, and the battery monitoring device 30 operates on the basis of a second clock signal generated by a second clock generator 50 included in the battery monitoring device 30. When receiving an instruction to correct the second clock signal from the battery monitoring ECU 10, a controller 48 of the battery monitoring device 30 causes the second clock generator 50 to correct a frequency of the second clock signal so that the frequency of the second clock signal is synchronized with or brought closer to a frequency of the first clock signal.

Hereinafter, configurations of the battery monitoring ECU 10 and the battery monitoring device 30 will be described.

The battery monitoring ECU 10 internally includes a CPU, a ROM, a RAM, an I/O, a bus line for connecting those components, and the like (not shown). Each processing in the battery monitoring ECU 10 may be software processing by executing a program stored in advance in a tangible memory device (that is, a readable non-transitory tangible recording medium) such as the ROM by the CPU, or may be hardware processing by a dedicated electronic circuit. The battery monitoring ECU 10 corresponds to a battery monitoring processor. The battery monitoring ECU 10 includes the first clock generator 12, a host controller 14, a transceiver 16, and the connectors 18 and 20 described above. The first clock generator 12 generates a first clock signal that is a basis of operation of the battery monitoring ECU 10. The first clock generator 12 generates a first clock signal which is a highly accurate clock signal by using a crystal oscillator. The first clock generator 12 may use an oscillator other than a crystal oscillator, for example, a silicon MEMS oscillator. Furthermore, the first clock generator 12 may receive a signal generated by a GNSS reference frequency generator from a GNSS satellite, and generate the first clock signal.

The host controller 14 generates a first superimposed signal in which battery monitoring information is superimposed on the first clock signal, and transmits the first superimposed signal to the transceiver 16. The battery monitoring information includes information specifying a battery to be monitored by the battery monitoring device 30 and a correction instruction indicating whether to cause the battery monitoring device 30 to correct the frequency of the second clock signal. The information specifying the battery to be monitored in the battery monitoring information indicates which battery is to be monitored. The battery to be monitored may be one specific battery in a specific pack, a specific plurality of batteries in a specific pack, all batteries in a specific pack, or all batteries in all packs. The correction instruction includes information as to the second clock signal of which battery monitoring device 30 is to be corrected, that is, information specifying the battery monitoring device 30 to be corrected. In the present embodiment, the correction instruction includes information indicating how much the frequency of the second clock signal is corrected, that is, an amount of correction of the frequency of the second clock signal in the battery monitoring device 30 to be corrected.

The battery monitoring information is superimposed on the first clock signal by, for example, phase encoding using a Manchester code. The battery monitoring information may be superimposed by a method other than the phase coding using the Manchester code, for example, phase shift keying.

The transceiver 16 outputs an instruction related to battery monitoring to at least one of the battery monitoring devices 30, and receives a result of the instruction from the at least one of the battery monitoring devices 30. The transceiver 16 generates a differential signal from the first superimposed signal and transmits the differential signal to the transmission path 22 via the connector 18. The differential signal is a signal obtained by converting one signal into two signals having phases opposite to each other. Each of the transmission paths 22 and 26 connecting the battery monitoring ECU 10 and the battery monitoring device 30 and each of the transmission paths 24, 25, . . . connecting one battery monitoring device 30 and another battery monitoring device 30 adjacent to the one battery monitoring device 30 have two signal lines. The transceiver 16 transmits an original signal to one signal line of the two signal lines of the transmission path 22, and transmits a signal of an opposite phase in which H and L are inverted to the original signal of one signal line to the other signal line. The connector 18 includes a capacitor, and connects the transceiver 16 and the transmission path 22 via the capacitor. Therefore, the connector 18 transmits only an AC component without transmitting a DC component of the differential signal.

From the battery monitoring device 30 on the last tier via the transmission path 26 and the connector 20, the transceiver 16 receives a differential signal of a second superimposed signal in which the battery monitoring information, the battery monitoring result in the battery monitoring devices 30 up to the previous tier, and difference information of the second clock signal in the battery monitoring devices 30 up to the previous tier are superimposed, and the transceiver 16 restores the second superimposed signal. The battery monitoring result is a result of executing battery monitoring processing on the basis of the battery monitoring information received by each of the battery monitoring devices 30 from the battery monitoring ECU 10, and includes information specifying the batteries monitored up to the previous tier and a measurement result of a state of the battery monitored by the battery monitoring devices 30 up to the previous tier. The difference information of the second clock signal of the battery monitoring device 30 is information indicating a difference between the second clock signal of the battery monitoring device 30 and the frequency of the clock signal of the device on the previous tier. The difference information of the second clock signal will be described later. Similarly to the connector 18, the connector 20 includes a capacitor, and connects the transmission path 26 and the transceiver 16 via the capacitor. The connector 20 transmits only an AC component without transmitting a DC component of the differential signal. Note that the connectors 18 and 20 may include a transformer in addition to the capacitor.

The battery monitoring device 30 includes a battery monitoring Integrated Circuit (IC) 40, a filter 60, and the connectors 34 and 36 described above. The battery monitoring IC 40 includes a receiver 42, a transmitter 44, a controller 48, a second clock generator 50, a frequency monitor 53, and a battery monitor 54. The receiver 42 is connected to the connector 34, and the transmitter 44 is connected to the connector 36. The controller 48 is connected to the receiver 42 and the transmitter 44. The second clock generator 50, the frequency monitor 53, and the battery monitor 54 are connected to the controller 48. The battery monitor 54 is connected to the batteries via the filter 60.

The receiver 42 of the battery monitoring device 30 on the first tier is connected to the transceiver 16 of the battery monitoring ECU 10 via the connector 34, the transmission path 22, and the connector 18. The receiver 42 of each of the battery monitoring devices 30 on the second to m-th tiers is connected to the transmitter 44 of the battery monitoring device 30 on the previous tier via the connector 34, the respective transmission path 24, 25, . . . , and the connector 36. The transmitter 44 of the battery monitoring device 30 on the m-th tier is connected to the transceiver 16 of the battery monitoring ECU 10 via the connector 36, the transmission path 26, and the connector 20.

The receiver 42 receives the differential signal from the device on the previous tier and restores the superimposed signal from the differential signal. Here, the device on the previous tier is the battery monitoring ECU 10 when the controller 48 is the controller 48 of the battery monitoring device 30 on the first tier, and is the battery monitoring device 30 when the controller 48 is the controller 48 of the battery monitoring device 30 on any of the second to m-th tiers. Here, the superimposed signal is the first superimposed signal when the controller 48 is the controller 48 of the battery monitoring device 30 on the first tier, and is the second superimposed signal generated by the battery monitoring device 30 on the previous tier when the controller 48 is the controller 48 of the battery monitoring device 30 on any of the second to m-th tiers.

The controller 48 extracts a clock of the superimposed signal received by the receiver 42 as a reference clock signal, and restores and decodes, from the superimposed signal, the battery monitoring information, the battery monitoring results up to the previous tier, and the difference information of the second clock signal of the battery monitoring devices 30 up to the previous tier. When the controller 48 is the controller 48 of the battery monitoring device 30 on the first tier, the superimposed signal is the first superimposed signal generated by the host controller 14 of the battery monitoring ECU 10, and the superimposed signal does not include the battery monitoring results up to the previous tier and the difference information of the second clock signal of the battery monitoring devices 30 up to the previous tier.

The reference clock signal is obtained by restoring the clock signal before superimposition from the received superimposed signal. Therefore, in the battery monitoring device 30 on the first tier, a frequency of the reference clock signal is the same as the frequency of the first clock signal, and in the battery monitoring devices 30 on the second to m-th tiers, the frequency of the reference clock signal is the same as the frequency of the second clock signal of the battery monitoring device 30 on the previous tier.

The controller 48 superimposes the battery monitoring information, the battery monitoring results up to the present tier, and the difference information of the second clock signal of the battery monitoring devices 30 up to the present tier on the second clock signal to generate the second superimposed signal.

The second clock generator 50 generates the second clock signal serving as a reference of the operation of the battery monitoring device 30 of the second clock generator 50. The second clock generator 50 includes an LC oscillator that is simpler than the crystal oscillator used in the first clock generator 12. Accordingly, the second clock signal is a clock signal with lower accuracy than the first clock signal. Since the second clock generator 50 uses the LC oscillator, an oscillation frequency can be easily changed and corrected by changing capacitance of the capacitor constituting the LC oscillator or inductance constituting an inductor in accordance with the correction instruction from the controller 48.

The frequency monitor 53 monitors the second clock signal generated by the second clock generator 50 and the reference clock signal, and detects how much the frequency of the second clock signal deviates from the frequency of the reference clock signal, that is, a difference between the frequencies. The controller 48 acquires this difference as the difference information of the second clock signal.

The battery monitor 54 detects the state of the battery by an AC impedance method using the second clock signal. Note that the controller 48 may cause the battery monitor 54 to constantly monitor the state of the battery, and in a case where there is a battery under monitoring in the battery monitoring information, the controller 48 may acquire a measurement result of the state of the battery detected by the battery monitor 54.

The transmitter 44 generates a differential signal from the second superimposed signal and transmits the differential signal to the device on the subsequent tier. Here, the device on the subsequent tier is the battery monitoring device 30 when the controller 48 is the controller 48 of the battery monitoring device 30 on any of the first to (m−1)-th tiers, and is the battery monitoring ECU 10 when the controller 48 is the controller 48 of the battery monitoring device 30 on the m-th tier.

(Operation of Battery Monitoring System 100)

Figure 2:
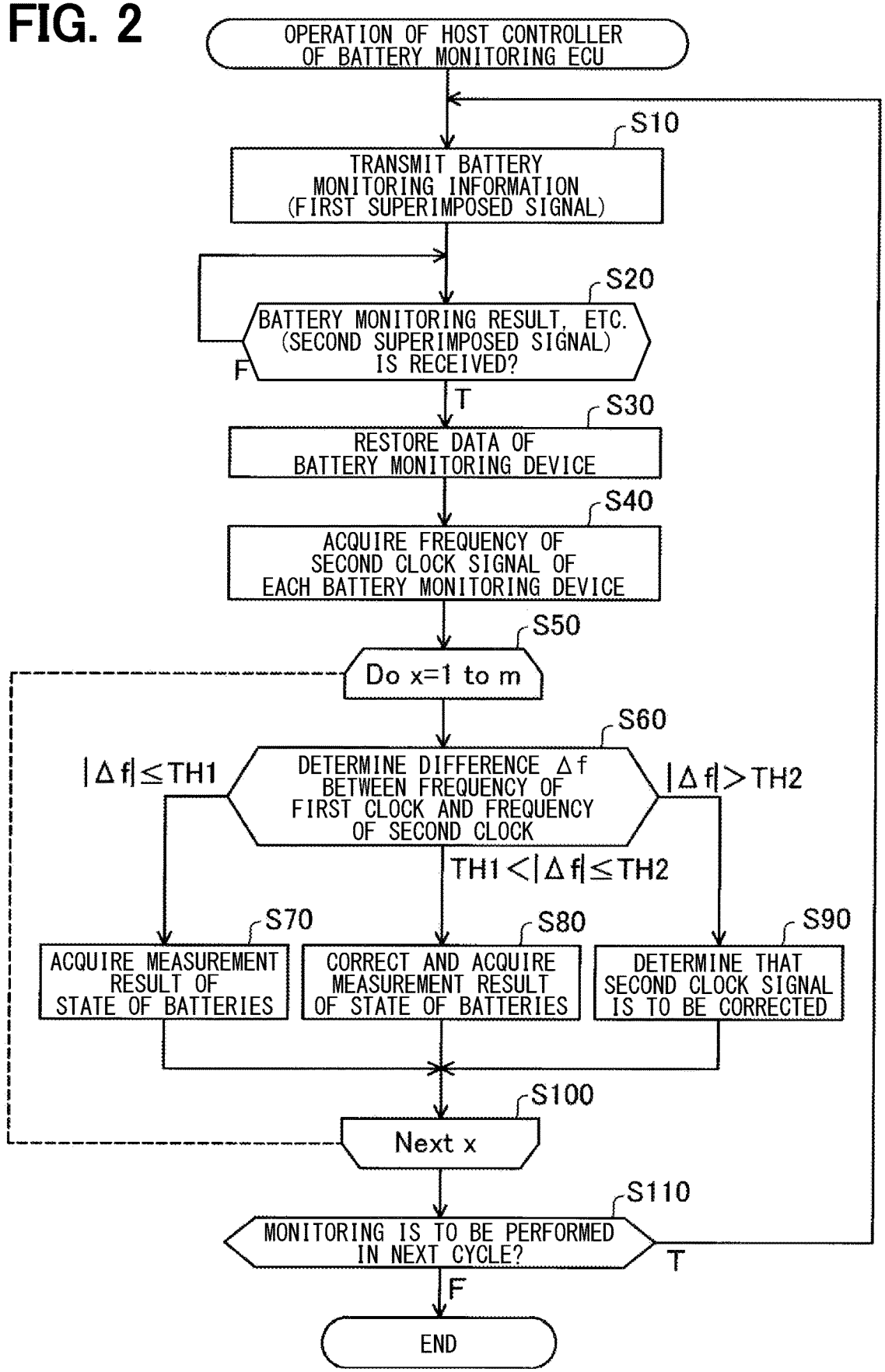
FIG. 2 is a flowchart of processing executed by a controller of a battery monitoring ECU.

FIG. 2 is a flowchart of processing executed by the host controller 14 of the battery monitoring ECU 10. In step S10, the host controller 14 of the battery monitoring ECU 10 transmits the battery monitoring information to the battery monitoring device 30 on the first tier. Specifically, the host controller 14 of the battery monitoring ECU 10 generates the first superimposed signal by superimposing the battery monitoring information on the first clock signal. The host controller 14 causes the transceiver 16 to generate a differential signal from the first superimposed signal and transmit the differential signal to the battery monitoring device 30 on the first tier. The battery monitoring information includes correction instruction information indicating whether to correct the frequency of the second clock signal of the battery monitoring device 30. Note that a first instruction to acquire the state of the battery does not include a correction instruction to correct the frequency of the second clock signal of the battery monitoring device 30.

In step S20, the host controller 14 of the battery monitoring ECU 10 receives the battery monitoring result for the instruction to monitor the state of the battery and the difference information of the second clock signal of the battery monitoring device 30 from the battery monitoring device 30 on the m-th tier which is the last tier. This result is superimposed on the second superimposed signal. When a determination result in step S20 is true (T), which means the host controller 14 has received the second superimposed signal, the host controller 14 shifts the processing to step S30. On the other hand, when the determination result in step S20 is false (F), which means the second superimposed signal has not been received, the host controller 14 repeats step S20 until the determination result is true (T), which means the second superimposed signal has been received.

In step S30, the host controller 14 restores, from the second superimposed signal, a monitoring result of the state of the battery in the battery monitoring device 30 on each tier and the difference information as a deviation of the frequency of the second clock signal from the frequency of the reference clock signal in the battery monitoring device 30 on each tier.

In step S40, the host controller 14 calculates and acquires the frequency of the second clock signal in the battery monitoring device 30 on each tier by using the frequency of the first clock signal and the difference information between the frequency of the second clock signal in the battery monitoring device 30 on each tier and the frequency of the reference clock signal.

Steps S50 to S100 are in a loop, and the host controller 14 performs processing on the battery monitoring device 30 on each tier. In step S60, the host controller 14 determines a relationship between a difference $\Delta f$ between the frequency of the first clock signal and the frequency of the second clock signal and magnitudes of two threshold values, a first threshold value TH1 and a second threshold value TH2. The second threshold value TH2 is larger than the first threshold value TH1. When an absolute value $|\Delta f|$ of the difference $\Delta f$ of frequency is equal to or smaller than the first threshold value TH1, the host controller 14 shifts the processing to step S70. When the absolute value $|\Delta f|$ of the difference $\Delta f$ of frequency is larger than the first threshold value TH1 and equal to or smaller than the second threshold value TH2, the host controller 14 shifts the processing to step S80. When the absolute value $|\Delta f|$ of the difference $\Delta f$ of frequency is larger than the second threshold value TH2, the host controller 14 shifts the processing to step S90.

In step S70, the host controller 14 acquires the monitoring result of the state of the battery in the battery monitoring device 30 superimposed on the second superimposed signal as it is as the monitoring result of the state of the battery. Thereafter, the processing proceeds to step S100.

In step S80, the host controller 14 corrects the monitoring result of the state of the battery in the battery monitoring device 30 superimposed on the second superimposed signal by using the difference between the frequency of the first clock signal and the frequency of the second clock signal, and acquires the result as the monitoring result of the state of the battery. Thereafter, the processing proceeds to step S100.

In step S90, the host controller 14 determines that the frequency of the second clock signal is to be corrected. Thereafter, the processing proceeds to step S100.

In step S110, the host controller 14 determines whether to monitor the battery in the next cycle. When the absolute value $|\Delta f|$ of the difference $\Delta f$ of frequency is larger than the second threshold value TH2 in at least one battery monitoring device of the battery monitoring devices 30, the host controller 14 may determine that the battery is to be monitored in the next cycle. When the determination in step S110 is true (T), which means monitoring is to be performed in the next cycle, the host controller 14 shifts the processing to step S10 and repeats the processing described above. Note that, in step S10 in and after the next cycle back from step S110 to step S10, the battery monitoring information includes a correction instruction to correct the frequency of the second clock signal of the battery monitoring device 30. Therefore, the frequency of the second clock signal is corrected in the battery monitoring device 30 that has received the correction instruction. When the determination in step S110 is false (F), which means monitoring is to not to be performed in the next cycle, the host controller 14 ends the processing.

Figure 3:
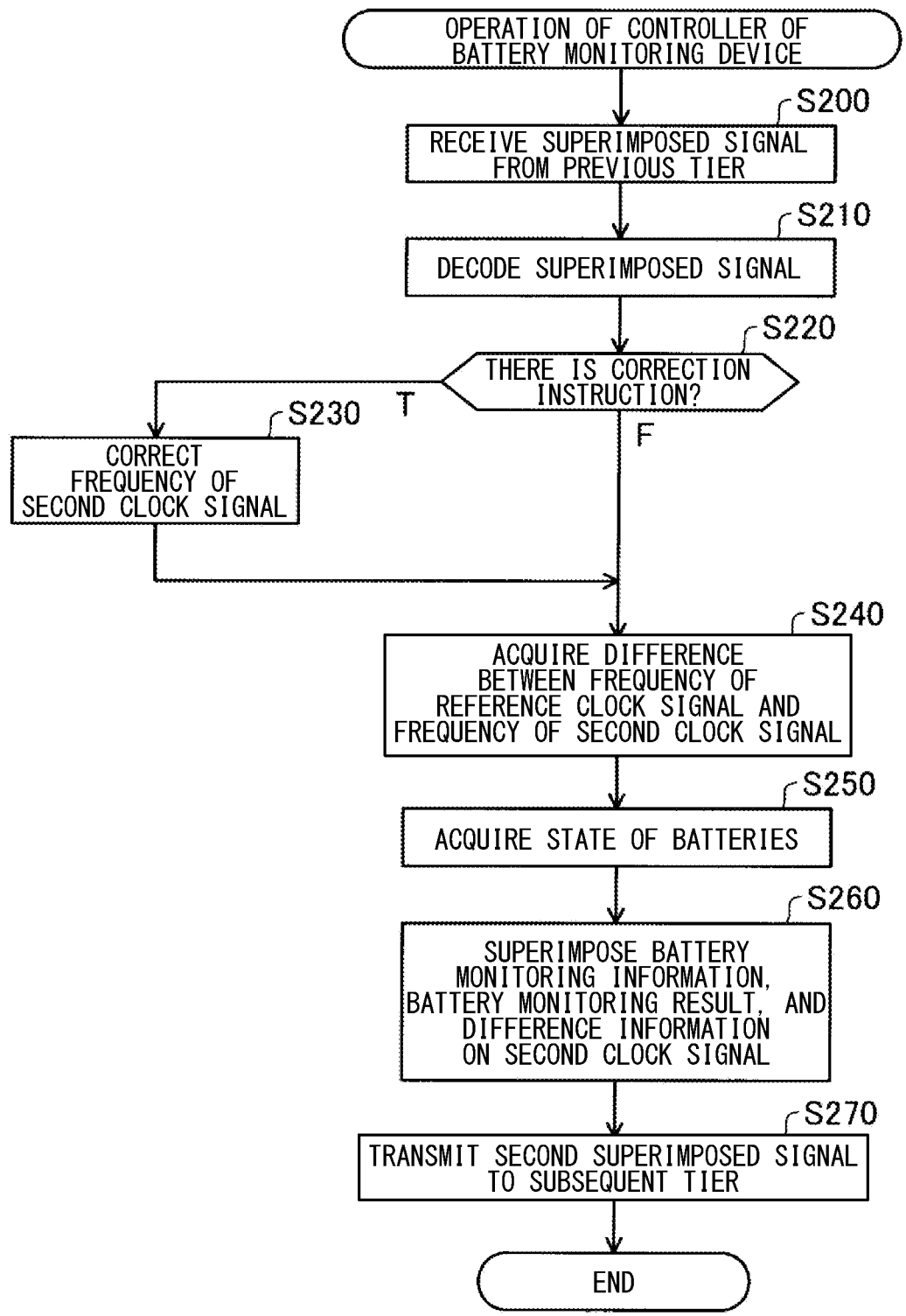
FIG. 3 is a flowchart of operation executed by a controller of a battery monitoring device.

FIG. 3 is a flowchart of operation executed by the controller 48 of the battery monitoring device 30. In step S200, the controller 48 receives a superimposed signal from the device on the previous tier through the receiver 42. Here, the device on the previous tier is the battery monitoring ECU 10 when the battery monitoring device 30 is the battery monitoring device on the first tier, and the device on the previous tier is the battery monitoring device 30 when the battery monitoring device 30 is the battery monitoring device on any of the second to m-th tiers. The superimposed signal is the first superimposed signal when the battery monitoring device 30 is the battery monitoring device on the first tier, and the superimposed signal is the second superimposed signal when the battery monitoring device 30 is the battery monitoring device on any of the second to m-th tiers.

In step S210, the controller 48 restores and decodes the superimposed signal to generate a reference clock signal. In the battery monitoring device 30 on the first tier, the superimposed signal is the first superimposed signal. Therefore, the controller 48 generates a reference clock signal having the same frequency as the frequency of the first clock signal, and acquires the battery monitoring information. In the battery monitoring device 30 on any of the second to m-th tiers, the superimposed signal is the second superimposed signal. Therefore, the controller 48 generates a reference clock signal having the same frequency as the frequency of the second clock signal on the previous tier, and acquires battery monitoring information, a monitoring result of the state of the battery (also referred to as a "battery monitoring result") on each tier up to the previous tier, and difference information indicating a deviation of the frequency of the second clock signal from the frequency of the reference clock signal on each tier up to the previous tier.

In step S220, the controller 48 determines whether the battery monitoring information includes a correction instruction to correct the frequency of the second clock signal. When the determination in step S220 is true (T), which means the battery monitoring information includes the correction instruction to correct the frequency of the second clock signal, the controller 48 shifts the processing to step S230. On the other hand, when the determination in step S220 is false (F), which means the battery monitoring information does not include the correction instruction to correct the frequency of the second clock signal, the controller 48 shifts the processing to step S240.

In step S230, the controller 48 instructs the second clock generator 50 to correct the frequency of the second clock signal. As described above, the second clock generator 50 changes and corrects the oscillation frequency by changing the capacitance of the capacitor constituting the LC oscillator or inductance constituting the inductor.

In step S240, the controller 48 acquires a difference between the frequency of the reference clock signal and the frequency of the second clock signal generated by the second clock generator 50 from the frequency monitor 53.

In step S250, the controller 48 acquires, from the battery monitor 54, the state of the battery to be monitored detected by the battery monitor 54 by using the second clock signal.

In step S260, the controller 48 generates the second superimposed signal by superimposing the battery monitoring information, the battery monitoring result on each tier up to the present tier, and the difference information indicating the deviation between the frequency of the reference clock signal and the frequency of the second clock signal on each tier up to the present tier, on the second clock signal.

In step S270, the controller 48 causes the transmitter 44 to generate a differential signal from the second superimposed signal and transmit the differential signal to the device on the subsequent tier. As described above, the device on the subsequent tier is the battery monitoring ECU 10 when the controller 48 is the battery monitoring device 30 on the m-th tier which is the last tier, and the device on the subsequent tier is the battery monitoring device 30 when the controller 48 is the battery monitoring device 30 on other than the m-th tier.

Figure 4:
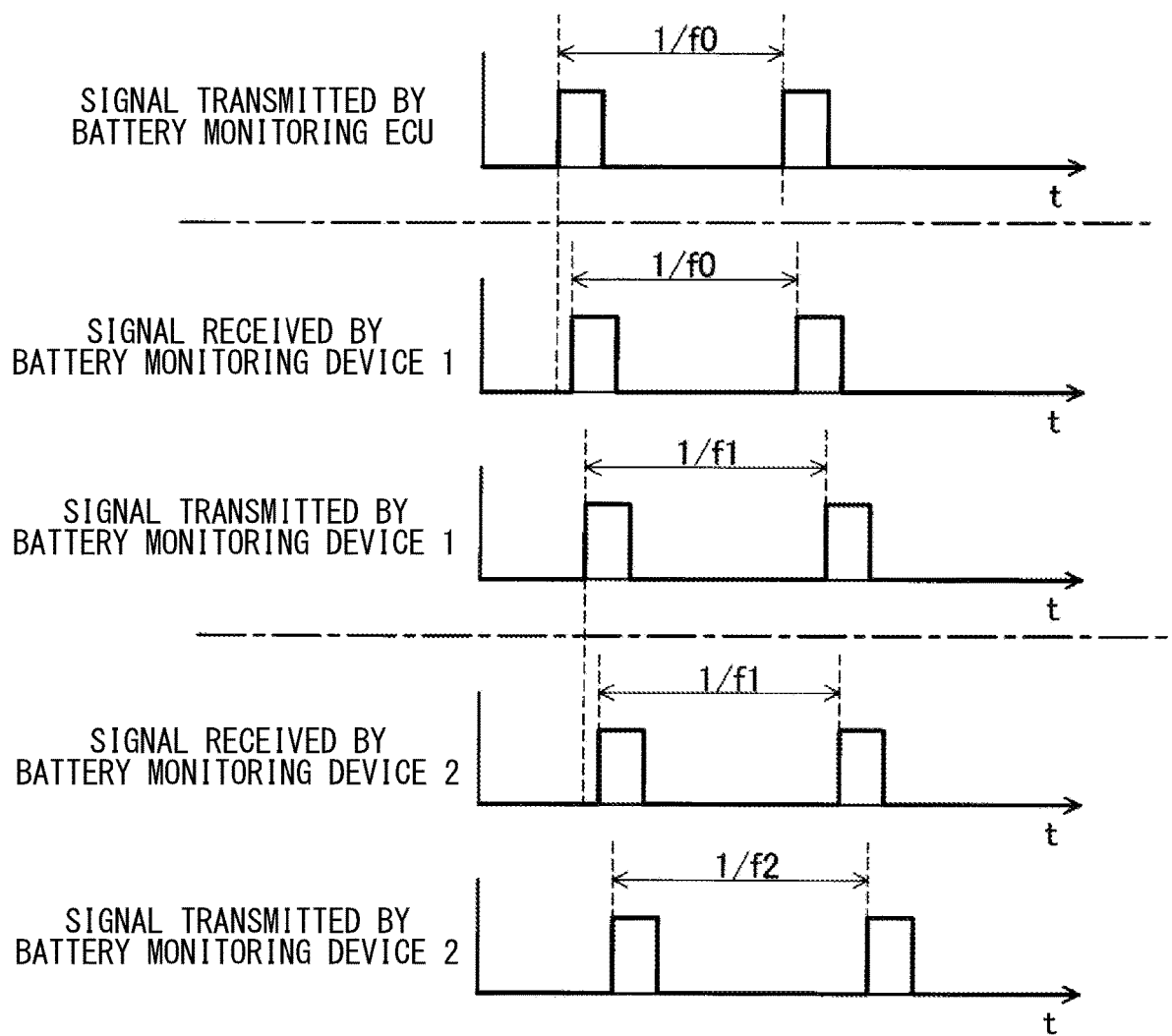
FIG. 4 is an explanatory diagram of a first superimposed signal transmitted by the battery monitoring ECU and a second superimposed signal transmitted and received by the battery monitoring device.

FIG. 4 is an explanatory diagram of the first superimposed signal transmitted by the battery monitoring ECU 10 and the second superimposed signal transmitted and received by the battery monitoring device 30. The battery monitoring ECU 10 transmits the first superimposed signal having frequency f0. The receiver 42 of the battery monitoring device 30 on the first tier receives the first superimposed signal having frequency f0, and the transmitter 44 of the battery monitoring device 30 on the first tier transmits the second superimposed signal having frequency f1. The receiver 42 of the battery monitoring device 30 on the second tier receives the second superimposed signal having frequency f1, and the transmitter 44 of the battery monitoring device 30 on the second tier transmits the second superimposed signal having frequency f2. Similarly, the receiver 42 of the battery monitoring device 30 on the x-th tier receives the second superimposed signal having frequency f(x−1), and the transmitter 44 of the battery monitoring device 30 on the x-th tier transmits the second superimposed signal having frequency fx.

In the battery monitoring device 30 on the first tier, frequency f1−f0 is a difference Δf1 which is a relative deviation between the frequency of the reference clock signal (first clock signal) and the frequency of the second clock signal on the first tier. In the battery monitoring device 30 on the second tier, frequency f2−f1 is a difference Δf2 which is a relative deviation between the frequency of the reference clock signal (second clock signal) and the frequency of the second clock signal on the second tier. Similarly, in the battery monitoring device 30 on the x-th tier, frequency fx−f(x−1) is a difference Δfx which is a relative deviation between the frequency of the reference clock signal (second clock signal) and the frequency of the second clock signal on the x-th tier. In the battery monitoring device 30 on the x-th tier, the controller 48 sequentially adds the differences Δf1 to Δfx up to the x-th tier when generating the second superimposed signal. That is, the differences Δf1 to Δfm of frequency in the battery monitoring device 30 on each tier are added to the second superimposed signal.

The battery monitoring ECU 10 calculates the frequency of the second clock signal sequentially from the battery monitoring device 30 on the first tier by using frequency information of the first clock signal and the frequency differences Δf1 to Δfm in the battery monitoring device 30 on each tier. That is, frequency f1 of the second clock of the battery monitoring device 30 on the first tier is f0+Δf1, and frequency f2 of the second clock of the battery monitoring device 30 on the second tier is f1+Δf2=f0+Δf1+Δf2. Similarly, the host controller 14 can calculate frequencies f3 to fm of the second clock of the battery monitoring devices 30 on the third to m-th tiers. The host controller 14 can obtain an absolute error of the frequency of the second clock signal on each tier for the frequency f0 of the first clock signal by comparing frequency f0 of the first clock signal with frequencies f1 to fm of the second clock signal in the battery monitoring device 30 on each tier. Then, the host controller 14 can determine how much the frequency of the battery monitoring device 30 at which tier is to be corrected.

As described above, in the present embodiment, the controller 48 of the battery monitoring device 30 outputs a monitoring result of the frequency of the second clock signal to the subsequent tier. As a result, the host controller 14 of the battery monitoring ECU 10 can calculate the frequency of the second clock signal on each tier by using the monitoring result of the frequency of the second clock signal on each tier and determine the second clock signal of which battery monitoring device 30 is to be corrected.

In the present embodiment, the host controller 14 of the battery monitoring ECU 10 transmits the correction instruction to the battery monitoring device 30. In the battery monitoring device 30 on each tier, the controller 48 extracts the differences from the first tier to the previous tier included in the superimposed signal from the previous tier, and obtains a frequency difference between the frequency of the first clock signal received by the first tier from the battery monitoring ECU and the frequency of the second clock signal on the present tier in consideration of the differences. When the frequency difference is larger than a predetermined threshold value, the controller 48 on the present tier may cause the second clock generator 50 to correct the frequency of the second clock signal in accordance with the deviation of frequency. In the next cycle, the number of battery monitoring devices 30 in which the second clock signal is to be corrected can be reduced.

In the present embodiment, the host controller 14 can calculate and acquire the absolute deviation of the frequency of the second clock signal from the frequency of the first clock signal, that is, a frequency difference between the frequency of the second clock signal and the frequency of the first clock signal by using the difference information on each tier of the battery monitoring devices 30.

In the present embodiment, the host controller 14 can acquire the absolute deviation of the frequency of the second clock signal from the frequency of the first clock signal, that is, the frequency difference between the frequency of the second clock signal and the frequency of the first clock signal together with the state of the battery.

In the present embodiment, when the difference between the frequency of the second clock signal in the battery monitoring device 30 and the frequency of the first clock signal is larger than the first threshold value TH1 and equal to or smaller than the second threshold value TH2, the host controller 14 can correct and acquire the state of the battery by using the difference between the frequencies of the first clock signal and the second clock signal.

In the present embodiment, when the frequency monitor 53 on the present tier determines that the relative deviation of the frequency of the second clock signal from the frequency of the reference clock signal extracted from the superimposed signal received from the battery monitoring device 30 on the previous tier is larger than the predetermined threshold value, the controller 48 on the present tier can cause the second clock generator to correct the frequency of the second clock signal in accordance with the deviation of the frequency.

Second Embodiment

Figure 5:
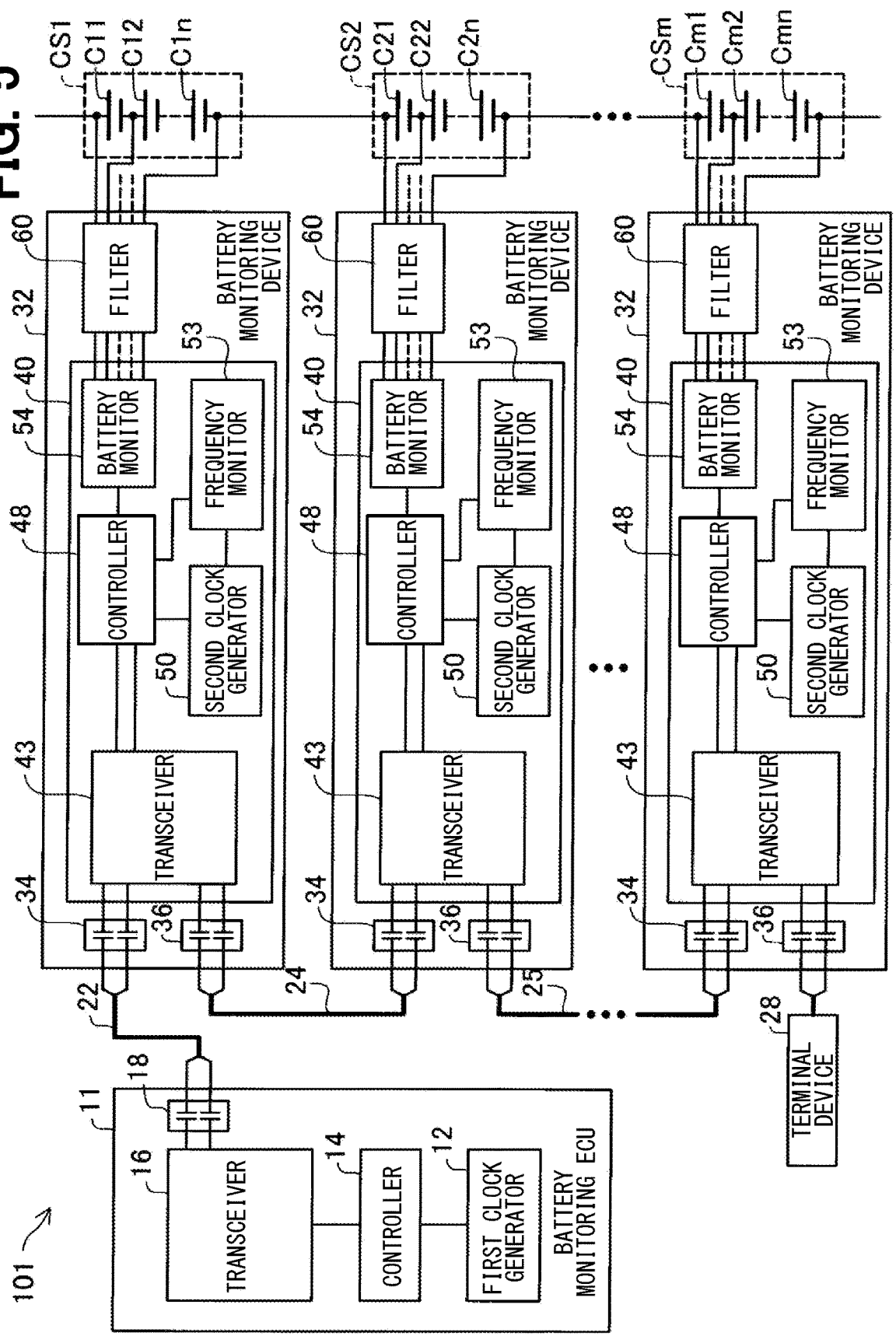
FIG. 5 is a schematic configuration diagram of a battery monitoring system according to a second embodiment.

FIG. 5 is a schematic configuration diagram of a battery monitoring system 101 according to a second embodiment. In the battery monitoring system 101 according to the second embodiment, a battery monitoring ECU 11 does not include the connector 20, and the transceiver 16 is connected to the transmission path 22 via the connector 18. In addition, a battery monitoring device 32 includes a transceiver 43 instead of the receiver 42 and the transmitter 44. The battery monitoring system 101 is different from the battery monitoring system 100 according to the first embodiment in that the battery monitoring ECU 10 and a plurality of battery monitoring devices 32 are daisy-chained. The battery monitoring device 32 includes two connectors 34 and 36, and a terminal device 28 is connected to the connector 36 of the battery monitoring device 32 on the m-th tier which is the last tier. Note that, depending on the configuration of the transceiver 43, the terminal device 28 does not need to be connected to the connector 36. In the first embodiment, the connector 34 is used as an input unit, and the connector 36 is used as an output unit. However, in the second embodiment, the connector 34 functions as an input unit, and the connector 36 functions as an output unit. The connector 36 can be switched to function as an input unit, and the connector 34 can be switched to function as an output unit. The second superimposed signal from the m-th tier which is the last tier is transmitted in a reverse direction from the battery monitoring device 32 on the m-th tier toward the battery monitoring device 32 on the first tier.

In the second embodiment, as in the first embodiment, the host controller 14 can obtain an error of the frequency of the second clock signal on each tier by comparing frequency f0 of the first clock signal with frequencies f1 to fm of the second clock signals in the battery monitoring device 30 on each tier. Then, the host controller 14 can determine how much the frequency of the battery monitoring device 30 at which tier is to be corrected.

Third Embodiment

Figure 6:
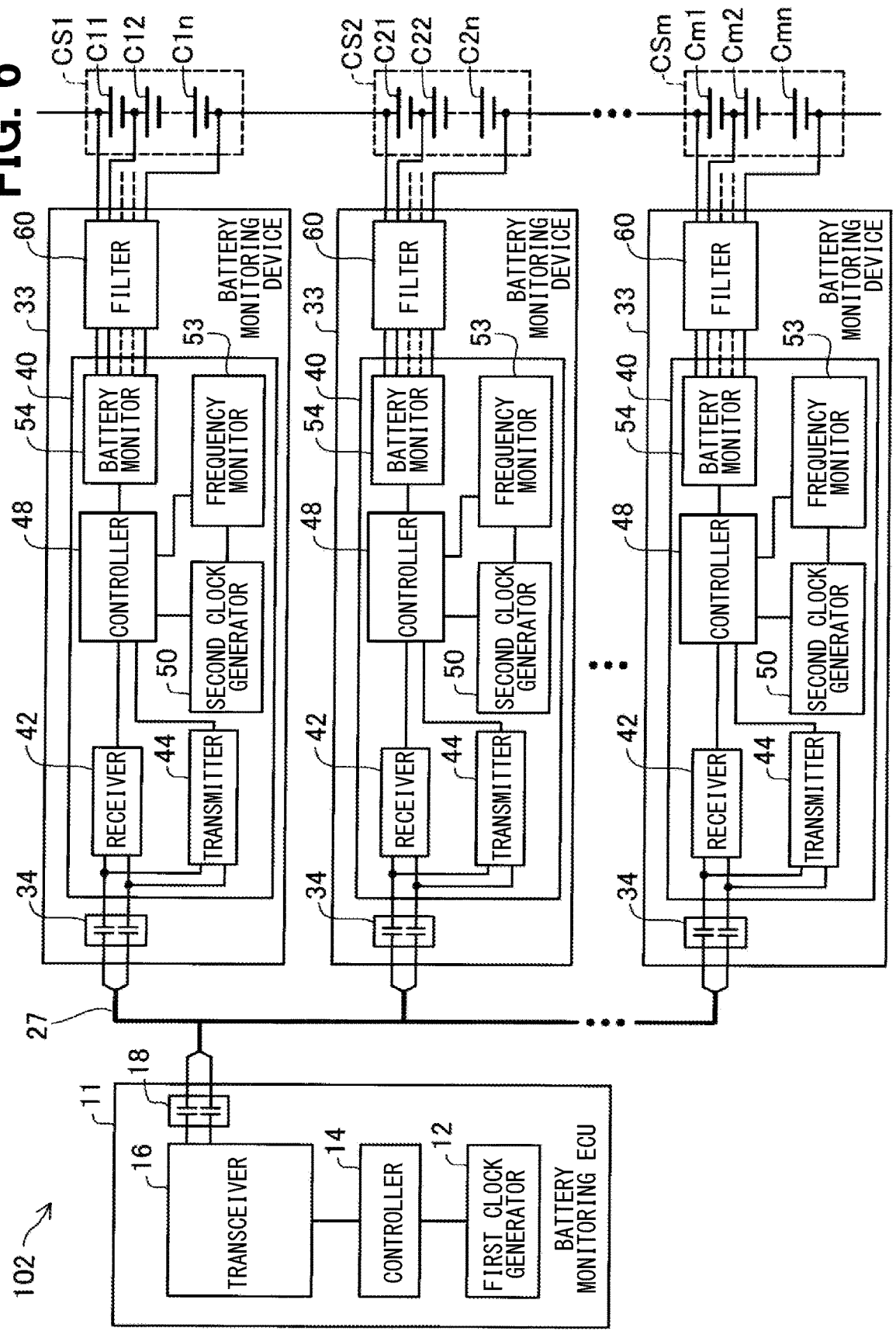
FIG. 6 is a schematic configuration diagram of a battery monitoring system according to a third embodiment.

FIG. 6 is a schematic configuration diagram of a battery monitoring system 102 according to a third embodiment. In the battery monitoring system 102 according to the third embodiment, a plurality of battery monitoring devices 33 are connected to the battery monitoring ECU 11 by multi-drop connection. The transceiver 16 of the battery monitoring ECU 11 does not include the connector 20, and is connected to a transmission path 27 via the connector 18. Each of the battery monitoring devices 33 does not include the connector 36, the receiver 42 and the transmitter 44 are connected to one connector 34, and the connector 34 is connected to the transmission path 27.

In the battery monitoring system 102 according to the third embodiment, a signal from the battery monitoring ECU 11 is transmitted to the receiver 42 of the battery monitoring device 33 on the first tier via the connector 18 and the transmission path 27. A signal output from the battery monitoring device 33 on the first tier is transmitted from the transmitter 44 to the receiver 42 of the battery monitoring device 33 on the second tier which is the following tier via the connector 34 and the transmission path 27. Similarly, a signal output from the battery monitoring device 33 on the x-th tier is transmitted from the transmitter 44 to the receiver 42 of the battery monitoring device 33 on the (x+1)-th tier which is the following tier via the connector 34 and the transmission path 27. A signal output from the battery monitoring device 33 on the m-th tier as the last tier is transmitted from the transmitter 44 to the transceiver 16 of the battery monitoring ECU 11 via the connector 34 and the transmission path 27. In this manner, each of the battery monitoring devices 30 sequentially transmits the superimposed signal by using the same transmission path 27. Regarding the transmission, each of the battery monitoring devices 33 sequentially transmits the superimposed signal to the subsequent tier with a right of use of the transmission path 27 by using a token.

In the third embodiment, the operation is the same as in the first embodiment, and similarly to the first embodiment, the host controller 14 can obtain an absolute error of the frequency of the second clock signal for the frequency of the first clock signal in the battery monitoring device 33 on each tier by comparing frequency f0 of the first clock signal with frequencies f1 to fm of the second clock signal in the battery monitoring device 33 on each tier. Then, the host controller 14 can determine how much the frequency of the battery monitoring device 33 at which tier is to be corrected.

As can be seen from the first to third embodiments, a connection form of the battery monitoring ECU and the plurality of battery monitoring devices can be various connection forms such as ring connection, daisy chain connection, and multi-drop connection.

The present disclosure is not limited to the above embodiments, and can be achieved by various configurations without departing from the gist of the present disclosure. For example, the technical features in each embodiment corresponding to the technical features in the forms described in the Summary can be appropriately replaced or combined in order to solve a part or all of the above-described problems or achieve a part or all of the above-described effects. The technical features, if not herein described as essential, can be deleted as appropriate. A control unit described in the present disclosure and a technique for the control unit may be implemented by a dedicated computer provided by configuring a processor and a memory programmed to perform one or more functions made concrete by a computer program. Or, a control unit described in the present disclosure and a technique for the control unit may be implemented by a dedicated computer provided by configuring a processor with one or more dedicated hardware logic circuits. Alternatively, a control unit described in the present disclosure and a technique for the control unit may be implemented by one or more dedicated computers configured by combining a processor and a memory programmed to perform one or more functions with a processor constituted of one or more hardware logic circuits. A computer program may be stored in a computer-readable non-transitional tangible recording medium as an instruction executed by a computer.

What is claimed is:

1. A battery monitoring system that monitors states of a plurality of batteries, the battery monitoring system comprising:
a battery monitoring ECU; and
a plurality of battery monitoring devices, wherein
the battery monitoring ECU and the plurality of battery monitoring devices are connected to each other in any connection form of ring connection, daisy chain connection, or multi-drop connection,
the battery monitoring ECU includes
a first clock generator configured to generate a first clock signal, and
a transceiver configured to output a superimposed signal in which battery monitoring information is superimposed on the first clock signal to at least one of the plurality of battery monitoring devices, and receive a monitoring result of the states of the plurality of batteries, and
each of the plurality of battery monitoring devices includes
a receiver configured to receive the superimposed signal from a previous tier,
a second clock generator configured to generate a second clock signal serving as a reference of an operation of a corresponding battery monitoring device,
a controller configured to extract a clock of the superimposed signal from the previous tier as a reference clock signal, and restore the battery monitoring information,
a battery monitor configured to monitor a state of one or more batteries of the corresponding battery monitoring device by using the second clock signal and the battery monitoring information,
a frequency monitor configured to monitor a difference between a frequency of the reference clock signal and a frequency of the second clock signal, and
a transmitter configured to output, to a subsequent tier, the battery monitoring information, the monitoring result on tiers up to a present tier, and difference information indicating the difference on tiers up to the present tier.

2. The battery monitoring system according to claim 1, wherein
the battery monitoring ECU includes a host controller configured to calculate a frequency difference between the frequency of the second clock signal and a frequency of the first clock signal by using the difference information on each tier of the plurality of battery monitoring devices.

3. The battery monitoring system according to claim 2, wherein
the host controller acquires the frequency difference between the frequency of the second clock signal and the frequency of the first clock together with the state of the one or more batteries.

4. The battery monitoring system according to claim 2, wherein
when a difference between the frequency of the second clock signal in the corresponding battery monitoring device and the frequency of the first clock signal is larger than a first threshold value and equal to or smaller than a second threshold value, the host controller corrects and acquires the state of the one or more batteries of the corresponding battery monitoring device by using the difference between the frequency of the first clock signal and the frequency of the second clock signal.

5. The battery monitoring system according to claim 1, wherein
when the frequency monitor on the present tier determines that a relative deviation of the frequency of the second clock signal from the frequency of the reference clock signal extracted from the superimposed signal received from the battery monitoring device on the previous tier is larger than a predetermined threshold value, the controller on the present tier causes the second clock generator to correct the frequency of the second clock signal in accordance with the deviation of the frequency.

6. A battery monitoring system that monitors states of a plurality of batteries, the battery monitoring system comprising:
a battery monitoring processor; and
a plurality of battery monitoring devices, wherein
the battery monitoring processor and the plurality of battery monitoring devices are connected to each other in any connection form of ring connection, daisy chain connection, or multi-drop connection,
the battery monitoring processor configured to
generate a first clock signal, and
output a superimposed signal in which battery monitoring information is superimposed on the first clock signal to at least one of the plurality of battery monitoring devices, and receive a monitoring result of the states of the plurality of batteries, and
each of the plurality of battery monitoring devices, as a present tier, includes a battery monitoring integrated circuit configured to
receive the superimposed signal from a previous tier that is the battery monitoring processor when the present tier is a first battery monitoring device in the connection form, or one of the plurality of battery monitoring devices when the present tier is not the first battery monitoring device in the connection form,
generate a second clock signal serving as a reference of an operation of the present tier,
extract a clock of the superimposed signal from the previous tier as a reference clock signal,
restore the battery monitoring information,
monitor a state of one or more batteries of the present tier by using the second clock signal and the battery monitoring information,
monitor a difference between a frequency of the reference clock signal and a frequency of the second clock signal, and
output, to a subsequent tier, the battery monitoring information, the monitoring result on tiers up to the present tier, and difference information indicating the difference on tiers up to the present tier.

* * * * *